United States Patent [19]

Portugall et al.

[11] Patent Number: 4,960,552

[45] Date of Patent: Oct. 2, 1990

[54] PRODUCTION OF SHEETLIKE PRESHAPES

[75] Inventors: Michael Portugall, Wachenheim; Franz Schumacher, Gruenstadt; Erhard Seiler, Ludwigshafen, all of Fed. Rep. of Germany

[73] Assignee: BASF Aktiengesellschaft, Ludwigshafen, Fed. Rep. of Germany

[21] Appl. No.: 14,545

[22] Filed: Feb. 13, 1987

[30] Foreign Application Priority Data

Feb. 15, 1986 [DE] Fed. Rep. of Germany ....... 3604829

[51] Int. Cl.$^5$ .............................................. B29C 47/14
[52] U.S. Cl. ................................. 264/108; 264/176.1; 264/331.21
[58] Field of Search ................ 264/108, 176.1, 331.21; 156/308.2

[56] References Cited

U.S. PATENT DOCUMENTS

| | | | |
|---|---|---|---|
| 4,332,759 | 6/1982 | Ide | 264/108 |
| 4,384,016 | 5/1983 | Ide et al. | 156/308.2 |
| 4,508,891 | 4/1985 | Bailey et al. | 264/257 |
| 4,581,399 | 4/1986 | Yoon | 264/331.21 |
| 4,614,629 | 9/1986 | Economy et al. | 264/176.1 |

FOREIGN PATENT DOCUMENTS

| | | | |
|---|---|---|---|
| 52-06761 | 1/1977 | Japan | 264/108 |
| 58-59818 | 4/1983 | Japan | 264/176.1 |

*Primary Examiner*—Jeffery Thurlow
*Attorney, Agent, or Firm*—Keil & Weinkauf

[57] ABSTRACT

A sheetlike, thermoplastically moldable preshape is produced by extruding a liquid-crystalline polymer by dividing the melt into two or more separate streams, then conferring different directions of orientation on the polymer in these separate streams, recombining the separate streams and extruding the recombined melt stream.

1 Claim, No Drawings

PRODUCTION OF SHEETLIKE PRESHAPES

The present invention relates to a process for producing sheetlike thermoplastically moldable preshapes based on liquid-crystalline polymers and composed of two or more layers in which the polymer is oriented in different directions.

There are a number of known polymeric compounds which in the melt, on orientation of liquid-crystalline regions, exhibit anisotropic properties which can be preserved in the solid state, so that these compounds have enhanced mechanical properties in a preferred direction. These liquid-crystalline polymers are described, for example, in Polymer Liquid Crystals, Cifferri, Krigbaum, Meyer, Academic Press, 1982. On extruding the melt of a liquid-crystalline polymer through the slot die of a customary film extruder, the film thus produced is likewise found to have marked orientation in the direction of extrusion. By drawing the film in the takeoff direction the resulting anisotropy further enhances the mechanical properties.

EP-A-72 210 describes multiaxially oriented laminates which are composed of a plurality of layers of liquid-crystalline polymers in which the polymers are oriented in different directions. To produce this preshape, a film of a liquid-crystalline polymer is extruded in such a way that the polymer undergoes orientation. After cooling down, the film is cut into sections, and a plurality of these sections are draped on top of one another in such a way that the individual layers are oriented in different directions, for example at an angle of 90°. Finally, the layers are bonded to one another at temperatures above the softening point of the polymer.

It has been found that in particular multilayered laminates thus prepared, for example panels, undergo delamination on being subjected to a multiaxial stress. This phenomenon is also found on further processing multiaxially oriented preshapes by thermoplastic forming.

It is an object of the present invention to produce a multiaxially oriented preshape which does not delaminate under a multiaxial stress.

We have found that this object is achieved by melting a liquid-crystalline polymer in an extruder, dividing the melt into two or more separate streams, then conferring different directions of orientation on the polymer in the separate streams, recombining the separate streams before the polymer solidifies, and extruding the recombined melt stream as a sheetlike preshape.

This sheetlike preshape comprises two or more layers in which the polymer is oriented in different directions. These layers are surprisingly bonded to one another so well as to prevent delamination of the preshape.

Thermotropic liquid-crystalline polymers are known. They are wholly or partly aromatic polycondensates such as polyesters, polyester amides, polyether esters, polyester carbonates, polyester amide imides and similar polymers. The term "wholly aromatic" denotes in this context that each monomer unit in the polymer contributes to the polymer chain one or more aromatic ring, while the term "partly aromatic" signifies that the part of the monomer structures making up the chain are not aromatic, being in general aliphatic (linear or cyclic).

The abovementioned polymer classes contain a number of liquid-crystalline polymers suitable for the invention, but the list makes no presumption of completeness; in addition, not all the polymers of the abovementioned classes have a liquid-crystalline phase.

The existence of a liquid-crystalline phase in a particular polymer melt against the suitability of the material for use according to the invention can be demonstrated by means of a polarization microscope. Applied in a thickness of about 10 $\mu$m between glass plates and viewed between crossed polarizers, the polymer melts have textures which can be ascribed to mesomorphic phases. A detailed list of suitable polymers is contained in EP-A-1,340, -129,372, -131,846 and -139,303. However, the selection cited herein is only illustrative and is not meant to be limiting.

The preferred polymers form a liquid-crystalline phase below 400° C. Preference is given to those which form a liquid-crystalline phase below 360° C. Particular preference is given to wholly aromatic polyesters or wholly aromatic polyester amides.

In the process according to the invention, the liquid-crystalline polymer is melted in a customary extruder, preferably at 100°-250° C. above the glass transition temperature of the polymer. A specially designed extrusion die divides the melt stream from the extruder into two or more, preferably into 2 to 5, separate streams which flow through separate channels. These channels are provided with deflecting means which deflect the corresponding melt stream out of the original direction. The separate streams which are thus deflected at a preset angle in the opposite direction and in which the macromolecules are oriented in the direction of flow are recombined shortly before the discharge orifice of the die. The two or more separate streams thus recombined form a single melt stream composed of two or more layers which emerge from the die slot with differently oriented macromolecules in these layers.

The spectrum of properties of the sheetlike preshape thus produced can be varied by variation of the number of melt layers and of the flow angle between these layers.

A suitable apparatus is described in DE-A-3,603,432 which is the same as U.S. Ser. No. 011,125, filed Feb. 5, 1987, which is hereby incorporated by reference and now abandoned but is available for inspection by the public.

After the extrusion the film may be oriented in a conventional manner to increase the anisotropy of various properties of the resulting film.

The sheetlike preshape produced according to the invention is present in the form of films or panels from 0.05 to 10 mm, preferably from 0.5 to 5 mm, in thickness. The preshape can be processed by thermoplastic molding of the type described in EP-A-95,865 into completed moldings of high mechanical performance characteristics.

EXAMPLE 1

A copolyester of
7.7 mol % of hydroquinone,
7.7 mol % of 4,4'-dihydroxybiphenyl,
15.4 mol % of 2,7-dihydroxynaphthalene,
30.8 mol % of terephthalic acid,
38.4 mol % of 4-hydroxybenzoic acid
having an intrinsic viscosity of 1.94 dl/g (measured in 0.1% strength solution in pentafluorophenol at 60° C.) was extruded as a film at a melt temperature of 300° as follows:

The melt stream was divided in the apparatus of DE-A-3,603,432 into three separate streams which pass through convergingly tapering channels. The middle stream was left in the direction of extrusion; the upper stream was deflected so as to meet the middle stream from the left at an angle of 90°, viewed in the direction of extrusion, while the lower stream rejoined the middle stream from the right at an angle of 90°. The extruded film was 40 cm wide and 300 μm thick.

A film section of 30×30 cm was subjected to a thermoforming process producing conical cups of 4.3 mm in height with a bottom diameter of 6 cm and a rim diameter of 7 cm. The cups obtained withstand mechanical stress without delamination.

EXAMPLE 2 (comparative example)

The copolyester of Example 1 was extruded in a customary film extruder with a simple slot die at a melt temperature of 300° C. as a 40 cm wide and 100 μm thick film.

Three film sections of 30×30 cm were draped on top of one another at an angle in each case of 90° with respect to the direction of extrusion of the film. The assembly was compressed at 200° C. and 40 bar for 10 min to produce a 300 μm thick laminate. This laminate was molded into a cup as described in Example 1. This cup exhibited signs of delamination even under a light load with the individual layers becoming detached from one another in some places.

We claim:

1. A process for producing a sheetlike, thermoplastically moldable preshape based on a liquid-crystalline polymer and composed of two or more layers in which the polymer is oriented in different directions, which comprises melting the polymer in an extruder, dividing the melt into two or more separate streams, then conferring different directions of orientation on the polymer in the separate streams, recombining the separate streams before the discharge orifice of the extruder die before the polymer solidifies, and extruding the recombined single melt stream as a sheetlike preshape.

* * * * *